Dec. 22, 1959 E. J. H. BUSSARD 2,918,629

AUTOMATIC OVERLOAD PROTECTION SYSTEM

Filed Dec. 3, 1957

INVENTOR.
EMMERY J. H. BUSSARD.
BY Alden D. Redfield
Irwin P. Garfinkle
ATTORNEYS.

United States Patent Office 2,918,629
Patented Dec. 22, 1959

2,918,629

AUTOMATIC OVERLOAD PROTECTION SYSTEM

Emmery J. H. Bussard, Cincinnati, Ohio, assignor to AVCO Manufacturing Corporation, Cincinnati, Ohio, a corporation of Delaware Application December 3, 1957, Serial No. 700,449

4 Claims. (Cl. 330—51)

This invention relates generally to an automatic overload protection system for radio receivers and, more particularly, to an overload protection system for extremely sensitive radio receivers having relatively low power-handling capabilities.

The problem of overload in transistor circuitry is of particular importance because the transistor is a current-operated device, and a substantial amount of power is dissipated in the input circuit during normal operation. As is well known in the art, transistors have very limited power-dissipation capabilities and, thus, where the possibility exists of periodically excessive input currents, some means must be provided for automatically protecting the transistor against overload. I accomplish this result by providing in the input circuit of a transistor a unique arrangement including a variable impedance device which automatically increases in impedance when overload conditions exist.

Briefly described, the invention comprises a non-linear variable impedance device of the type which increases in impedance as the current increases and, in the embodiment illustrated, comprises a tungsten filament lamp connected in the input circuit of a transistor amplifier. The tungsten lamp is also connected in circuit with a diode which is normally biased a predetermined amount beyond cutoff, and the circuits are so arranged that the diode will conduct only upon the reception of an abnormally strong signal. The conduction of the diode at overload causes a very large increase in current through the lamp, and since the impedance of the lamp increases at a very rapid rate as the current increases, the transistor input impedance is sharply increased and the input signal is decreased, thereby preventing transistor overload.

A broad object of this invention is to provide protection for sensitive elements, such as transistors, which may be permanently impaired or destroyed by excessive input power.

Another object of this invention is to provide an automatic variable impedance device or potentiometer which is controlled by input power to yield an essentially constant output for a very wide range of input signals.

Still another object of this invention is to provide an automatic power transfer control device for the first active amplifier elements in a radio receiver system.

For a more comprehensive understanding of the nature and other objects of this invention, reference should now be made to the following detailed description and to the accompanying drawings, in which.

Figures 1, 2, 3, 4, 5:
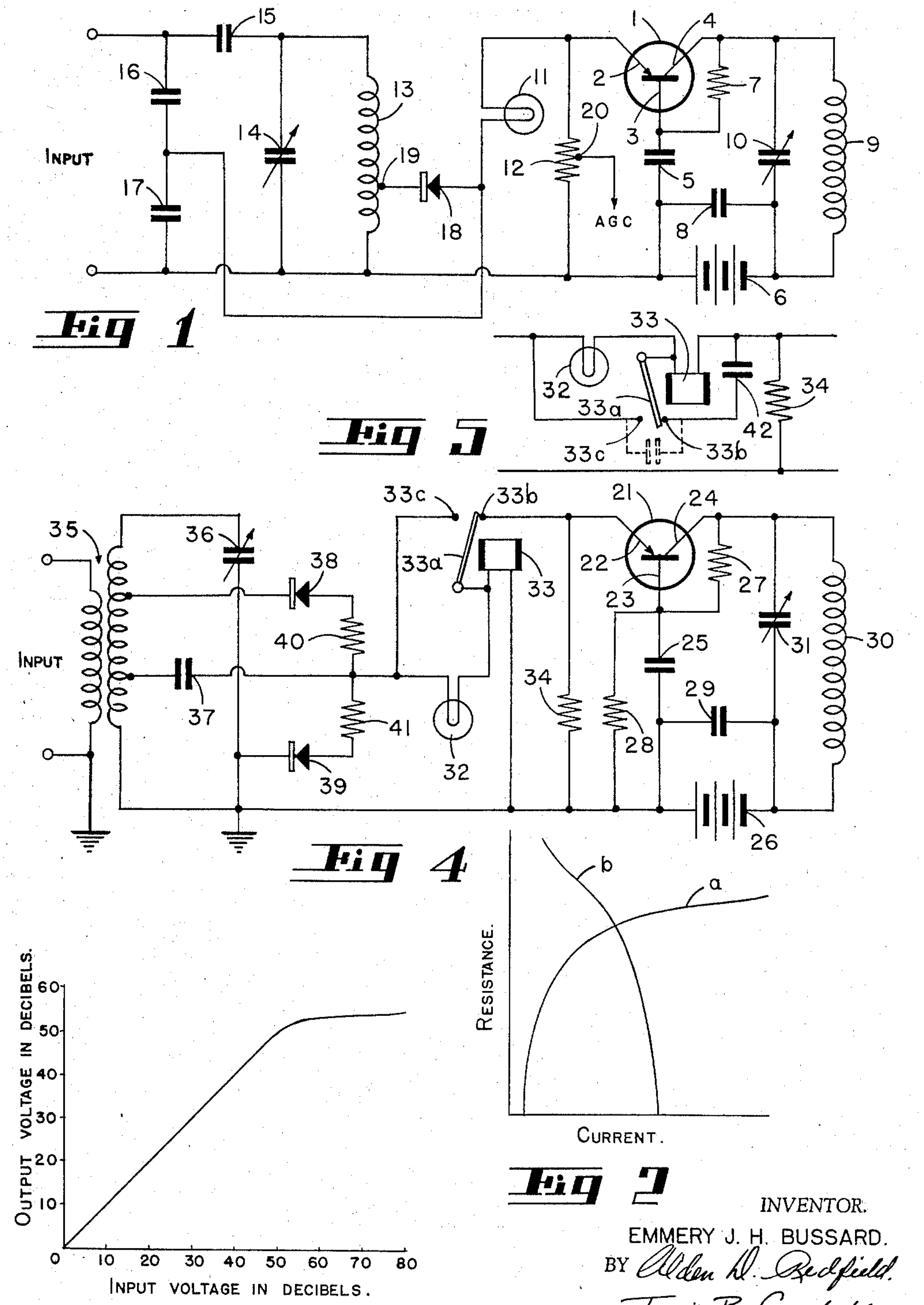
Fig. 1 is a circuit diagram of a preferred form of my invention.
Fig. 2 is a response curve of the automatic overload protective device used in accordance with my invention.
Fig. 3 is a curve illustrating the operating characteristics of my invention.
Fig. 4 is a circuit diagram of a second preferred embodiment of my invention.
Fig. 5 illustrates a modification of the embodiment in Fig. 4.

Referring now to Fig. 1 of the drawings, there is shown an antenna coupling stage embodying my unique overload protective arrangement. It is to be understood that use in an antenna coupling stage is merely illustrative, and the invention will find utility in or with any type of sensitive stage. Radio frequency signals intercepted by an antenna (not shown) are coupled by means of a tuned antenna coupling network to the input circuit of a transistor amplifier 1 having an emitter 2, a base 3 and a collector 4. The base 3 of transistor amplifier 1 is grounded for alternating currents by means of a condenser 5, and the transistor is connected in a common base configuration, i.e., the transistor signal input circuit is between the emitter 2 and the grounded base 3, and the signal output circuit is between the grounded base 3 and the collector 4. The transistor illustrated is a PNP type, but it is to be understood that, with appropriate circuit modifications NPN types are also suitable, and the invention is equally applicable to junction and point contact transistors. The electrodes of transistor 1 are appropriately biased by means of a battery 6 or other source of direct voltage and by means of the self-biasing feedback resistor 7, a condenser 8 providing an alternating current bypass for the battery.

The output circuit of transistor 1 includes a winding 9 tuned by variable condenser 10, while the input circuit comprises a variable impedance network including the filament of a tungsten lamp 11 and a fixed resistor 12 connected across the antenna coupling network. As will be seen, the filament of the lamp 11 and the resistor 12 constitute a variable potentiometer for supplying signals to the base-emitter electrodes of transistor amplifier 1.

The antenna coupling network comprises an autotransformer 13 tuned to the received frequency by means of a variable condenser 14, and across which are connected condensers 15, 16 and 17 to form a capacitive voltage divider. The condenser 15 also provides D.-C. blocking. The tuned network serves the general function of selectivity and impedance transformation, and it is clear that other types of tuned networks may also be used. The voltage on condenser 17 is applied across the filament of lamp 11 and the fixed resistor 12 in series, and the input to the transistor 1 is taken from across resistor 12. For a purpose hereinafter to be more fully explained, a diode 18 is connected between the lamp 11 and a tap 19 on the tuned autotransformer 13.

By proper design of the circuit values, the voltage drop across the resistor 12 biases the diode 18 sufficiently to render the diode non-conductive during normal operation of the system. (Note that the diode 18 is connected in accordance with the I.R.E. convention and that current flow is in the direction of the arrow.) On receipt of an excessive input signal, i.e., an input signal which exceeds the cutoff bias, the diode will conduct heavily, and a direct current path will be completed from the diode 18 through a portion of the turns of the autotransformer 13, the resistor 12 and the filament of the lamp 11.

As indicated by the curve *a* in Fig. 2, the filament of a typical tungsten lamp increases in resistivity at a very rapid rate with respect to current; and in the tungsten lamp illustrated, resistance increases at a rate proportional to the cube root of current. (Note that resistance is plotted on a logarithmic scale, while current is plotted on a linear scale.) During normal operation at high frequencies (above 30 mc.) the alternating current components are substantially bypassed by the inherent capacity of the lamp, the wiring, etc., and since there is no direct current flowing in the circuit, very little current passes through the lamp and its resistance changes very little. Thus, during normal operation an increase in current within the normal operating limits of the transistor will cause the filament resistance to increase only a small amount, and normal operation of the amplifier is unaffected except for a minor increase in noise. However, when the diode 18 conducts, due to an excessive signal, the direct current through the filament increases greatly and the resistance of the filament becomes very high. This results in effectively moving the transistor input down the potentiometer formed by the lamp 11 and the resistor 12, and thus reduces the alternating current input signal applied to the base-emitter diode of transistor 1, thereby decreasing the loading of the transistor. Also, because of the great increase in current and resistance in the lamp 11, the voltage at the emitter 2 will more closely approximate the voltage on the collector 4, thereby reducing the emitter-collector bias, and further reduce the amount of conduction through the transistor 1.

Initial conduction of the diode also serves to compensate for the decreased loading of the transformer resulting from increased transistor input impedance. However, the transistor is given additional protection when the diode conducts more heavily because a small resistance is shunted across a portion of the transformer and thereby destroys the Q of the tank circuit. If the forward resistance of the diode 18 is insufficient for the purpose of compensating the decreased loading, an additional resistor may be connected in series therewith. This resistor will also serve to limit diode current and to provide diode protection. As is well known in the art, when the circuit Q is reduced by conduction of the diode, there will be an increase in bandwidth, a reduction of gain and a dissipation of signal power.

The over-all operation of the system is indicated by the curve in Fig. 3. It is seen that as the input voltage, measured in decibels, increases to about 45 to 50 decibels above 100μV., the output voltage varies at a substantially linear rate. However, when the diode 18 conducts at about 45 to 50 decibels of input, the output remains substantially constant thereafter, and the transistor is not driven beyond that amount (about .05 volt).

In addition to providing the necessary protection for the transistor input circuits, the voltage divider, comprising the lamp 11 and the resistor 12, serves the additional function of providing the convenient source of automatic gain control. This is particularly true at conditions of overload, since an extremely large amount of power is dissipated in the lamp 11 and the resistor 12, and this power may be used for controlling succeeding stages by providing a tap 20 in the resistor 12, or at any other convenient point in the direct current circuit.

A second embodiment of this invention is illustrated in Fig. 4 wherein a radio frequency stage is provided with two diodes for full-wave rectification and a relay for protecting the filament of the lamp. In this embodiment I employ a transistor 21 having an emitter 22, a base 23 and a collector 24. As before, the base 23 is grounded for alternating current operation by means of a condenser 25, and the transistor is connected in the common base configuration. A PNP junction-type transistor is used, but it is to be understood that NPN type and point contact transistors may be used as well, and also that the transistor may be connected in the common emitter or common collector configuration. The electrodes of transistor 21 are appropriately biased by means of a battery 26 or other source of direct voltage and by means of self-biasing resistors 27 and 28, a condenser 29 providing an alternating current bypass for the battery.

As in the first embodiment, the output circuit of transistor 21 comprises a transformer winding 30 tuned by variable condenser 31; but the input circuit comprises a variable impedance network including the filament of a tungsten lamp 32 connected in series with the windings of a relay 33. The relay 33 has an armature **33*a* and two associated contacts 33*b* and 33*c*. In its normal position, the armature 33*a* engages the contact 33*b* to connect the windings of the relay 33 in parallel with the resistor 34 across the base-emitter diode of the transistor 21. In its overload position, the armature 33*a* is moved into engagement with the contact 33*c***.

The antenna coupling circuit may include a transformer 35 tuned by a variable condenser 36 or any other suitable network. The filament of lamp 32 and the windings of relay 33 are connected through D.-C. blocking condenser 37 across a portion of the secondary of transformer 35 and, for a purpose to be described, two diodes 38 and 39 are connected for full-wave rectification in circuit with the secondary of transformer 35 and the filament of the tungsten lamp 32. The resistors 40 and 41, connected in series with the diodes 38 and 39, respectively, are provided for the purpose of augmenting the forward resistances of the diodes, but these resistors may be omitted (as in Fig. 1) if the diodes 38 and 39 are selected so that their forward resistance is high enough to satisfy the requirements of the system; that is, the resistors 40 and 41 may be omitted if the diode resistance is large enough to limit the reduction of the Q of the circuit to a reasonable value at overload, and if the diodes are able to carry the full load. If the resistors 40 and 41 are used, they must be bypassed by suitable condensers in order that the alternating current signal be applied to the diode without attenuation. Above frequencies of approximately 20 mc. the capacity of the wiring in the circuit and the inherent capacity of the resistors is approximately correct for supplying the necessary amount of alternating current to the diodes. At lower frequencies it may be necessary to add small bypass condensers across resistors 40 and 41.

It may be seen that the filament of lamp 32 and the windings of relay 33 in parallel with resistor 34 constitute a potentiometer across which the signal developed in the antenna coupling network is applied, and that a portion of the signal on the potentiometer is coupled through the armature **33*a* and the contact 33*b* to the emitter 22 of transistor 21. By appropriate design of the circuit values and by proper selection of the relay 33 and resistor 34, the diodes 38 and 39 are provided with a bias sufficient to render them non-conductive during normal operation of the system. Thus, so long as the signal strength remains within the normal safe operating range of the receiver, the filament of lamp 32 will remain substantially inactive except for very slight series resistance change. However, an increase of signal strength above the diode bias will cause the diodes to conduct. During one half-cycle, direct current will flow from the diode 38 through a portion of the transformer 35, the windings of relay 33 and the resistor 34 in parallel, the filament of lamp 32 and the resistor 40. During the other half-cycle, direct current flows from the diode 39 through the windings of relay 33 and the resistor 34 in parallel, through the filament of lamps 32 and the resistor 41**.

As illustrated in Fig. 2, large currents through the filament of lamp 32 cause a very sharp increase in the resistance of the filament so that the transistor input is effectively moved down the potentiometer formed by the lamp and the relay windings. At the same time, the Q of the antenna is automatically reduced by the conduction through diodes 38 and 39 and through the associated limiting resistors 40 and 41.

The characteristics of relay 32 are selected so that further increase in signal strength will cause the relay to function before the filament of the tungsten lamp 32 reaches a damaging temperature. This moves the armature **33*a* of the relay from the contact 33*b* to the contact 33*c*, thereby short-circuiting the lamp 32 and causing a still higher current to flow through the relay 33 and effect a "lock-in" until the high signal input is removed. During the period when the relay has operated, receiver operation is continued by feeding the very attenuated and safe signal to the emitter 22 through the inter-electrode capacitance between the contacts 33***b* and 33*c*.

Another modification of my invention is illustrated in Fig. 5. In this embodiment it is seen that the lamp 32, the relay 33 and the resistor 34 are connected in series and that a condenser 42 is connected across the relay when the armature 33*a* is in the normal operating position, i.e., when the armature 33*a* engages contact 33*b*. During normal operation, alternating currents are substantially bypassed by the condenser 42 and the windings of the relay have little effect on circuit operation. Thus, overload control is exercised only by the lamp 32. However, when diodes 38 and 39 conduct as a result of an overload, the winding is energized by direct currents, and after a predetermined amount of overload, the relay 33 operates to move armature 33*a* from contact 33*b* to contact 33*c*. This short-circuits the lamp 32 to prevent it from burning out and, at the same time, it introduces the capacitance between the contacts 33*b* and 33*c* into circuit with the windings of relay 33 and with condenser 42. This circuit comprises a tank circuit which by proper design may be made resonant at the received frequency. This tank circuit is designed to have a very high Q and thereby provide a very high impedance trap for the overload signals and effectively protect the transistor.

It may be seen, therefore, that I have provided a variable impedance overload protection device for radio receivers which is highly efficient in operation and which provides adequate protection for the first stages at all levels of operation. While my invention will find most utility in transistorized circuits, it is not limited thereto, but may be used in conjunction with vacuum tubes, crystal detectors, and with any other control devices in which periodic conditions of overload may exist. Furthermore, many modifications may be made to the preferred embodiments without departing from the scope of this invention; for example, in Fig. 1 a fixed resistor may be substituted for the lamp 11 and a resistance having a negative temperature characteristic, as illustrated in the curve *b* of Fig. 2, may be substituted for the resistor 12. A carbon filament lamp having a 4:1 reduction in resistance over the operating range and having an initial resistance value about ten times the input impedance of the transistor is satisfactory for many applications. In addition, the combination of a tungsten lamp and a carbon lamp may also be used. For example, in Fig. 1 a carbon lamp may be substituted for the resistor 20 with the obvious result that the conduction of diode 18 will cause an increase in the resistance of lamp 11 and a decrease in the resistance of the carbon lamp. Clearly, this will provide even more protection for the transistor 1 than would be provided by a tungsten lamp or a carbon lamp used separately. Similar modifications may also be made to a full-wave rectification system, as illustrated in Fig. 4.

While my invention is not limited to any specific circuit parameters, the following circuit values were used in a successful operative embodiment:

| | |
|---|---|
| Transistor **1** | Type TA1629. |
| Diode **18** | Type IN 456. |
| Condenser **5** | 510 μμf. |
| Condenser **8** | 3,300 μμf. |
| Condenser **10** | ΔC 87 μμf. |
| Condenser **14** | ΔC 87 μμf. |
| Condenser **15** | 3 μμf. |
| Condenser **16** | 76 μμf. |
| Condenser **17** | 42 μμf. |
| Battery **6** | 26 volts. |
| Resistor **7** | 400 K ohms. |
| Resistor **12** | 220 ohms. |
| Winding **9** | .23 μh. |
| Lamp **11** | Type T-49. |

Having thus described preferred forms of my invention, what I claim is:

1. The combination comprising: a signal source; a sensitive electric translating device having input electrodes and output electrodes; a network coupling said source across said input electrodes, said network including a unidirectional conduction device and a potentiometer connected in series, said unidirectional conduction device being biased for nonconduction except when the voltage across said device exceeds a predetermined magnitude, said potentiometer comprising a first impedance element and a second impedance element, said second impedance element having characteristics such that its impedance varies with changes in current therethrough; means connecting said potentiometer across a portion of said source; means connecting said serially connected unidirectional conduction device and said potentiometer across another portion of said source; and means connecting said input electrodes across one of said impedance elements to produce a voltage across said input electrodes which varies in inverse relation to the voltage of said source until said source exceeds said predetermined magnitude whereupon conduction of said diode occurs, thereby rapidly increasing current through said potentiometer and further varying the impedance thereof to reduce the voltage applied across said electrodes to a safe operating degree.

2. The combination comprising: a signal source; a sensitive electric translating device having input electrodes and output electrodes; a network coupling said source across said input electrodes, said network including a unidirectional conduction device and a potentiometer connected in series, said unidirectional conduction device being biased for nonconduction except when the voltage across said device exceeds a predetermined magnitude, said potentiometer comprising a first impedance element and a second impedance element, said second impedance element having characteristics such that its impedance increases with increase in current therethrough, said first impedance element having a fixed value of impedance; means connecting said potentiometer across a portion of said source; means connecting said serially connected unidirectional conduction device and said potentiometer across another portion of said source; and means connecting said input electrodes across said first impedance element to produce a voltage across said input electrodes which varies in inverse relation to the voltage of said source until said source exceeds said predetermined magnitude whereupon conduction of said diode occurs, thereby rapidly increasing current through said potentiometer and further varying the impedance thereof to reduce the voltage applied across said electrodes to a safe operating degree.

3. The combination comprising: a signal source, one end of said source being connected to a point of reference potential; a transistor having base, emitter, and collector electrodes, said base electrode being connected to said point of reference potential; a network coupling said source across said emitter and base electrodes, said network including a relay, an impedance element and a unidirectional conduction device, said relay having a relay winding, and a movable contact movable between first and second fixed contacts, said unidirectional conduction device being biased for nonconduction except when the voltage across said unidirectional conduction device exceeds a predetermined magnitude, said impedance element having characteristics such that its impedance increases with increases in current therethrough; means connecting said unidirectional conduction device, said impedance element and said relay winding in series across a first portion of said source; means connecting said impedance element and said relay winding in series across a second portion of said source; means electrically connecting said movable contact to the junction of said impedance element with said second fixed contact; means electrically connecting said first fixed contact to the junction of said unidirectional conduction device and said impedance element; and means electrically connecting said second fixed contact to said emitter electrode, whereby the voltage applied across said emitter and base electrodes is limited in inverse relation to the magnitude of said source until the voltage drop across said unidirectional conduction device exceeds a predetermined magnitude, whereupon conduction of said unidirectional conduction device occurs and rapidly varies the impedance of said impedance element thereby rapidly reducing the voltage across said base and emitter electrodes, a further increase in voltage at said source energizing said relay to move said movable contact from said second fixed contact to said first fixed contact thereby short-circuiting said impedance element, the circuit from said source to said electrodes being completed through the inter-electrode capacity between said first and second fixed contacts.

4. The combination comprising: a signal source; a sensitive electric translating device having input electrodes and output electrodes; a network coupling said source across said input electrodes, said network including a unidirectional conduction device and a potentiometer connected in series, said potentiometer comprising first and second impedance elements, said second impedance element having characteristics such that its impedance increases with increases in current; means connecting said serially connected unidirectional conduction device and said potentiometer across said source; and means connecting said input electrodes across said first impedance element, whereby the voltage applied across said input electrodes is limited in inverse relation to the magnitude of the voltage of said source until said source exceeds said predetermined magnitude whereupon conduction of said diode occurs thereby rapidly increasing current through said potentiometer and further varying the impedance thereof to reduce the voltage applied across said electrodes to a safe operating degree.

References Cited in the file of this patent

UNITED STATES PATENTS

| | | |
|---|---|---|
| 1,708,027 | Ohl | Apr. 9, 1929 |
| 2,153,172 | Bushbeck | Apr. 4, 1939 |
| 2,247,203 | Roberts | June 24, 1941 |
| 2,504,699 | Kluender | Apr. 18, 1950 |
| 2,849,662 | Britten | Aug. 26, 1958 |